United States Patent
Maehara et al.

(10) Patent No.: US 7,610,903 B2
(45) Date of Patent: Nov. 3, 2009

(54) MULTICYLINDER INTERNAL COMBUSTION ENGINE

(75) Inventors: Hayato Maehara, Saitama (JP); Shinji Saito, Saitama (JP); Satoru Nojima, Saitama (JP); Takaaki Tsukui, Saitama (JP); Takeru Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/902,192

(22) Filed: Sep. 19, 2007

(65) Prior Publication Data
US 2008/0072869 A1 Mar. 27, 2008

(30) Foreign Application Priority Data
Sep. 21, 2006 (JP) .............................. 2006-256004

(51) Int. Cl.
*F02D 7/00* (2006.01)
*F02D 7/02* (2006.01)
(52) U.S. Cl. .................................... 123/481; 123/198 F
(58) Field of Classification Search ................. 123/481, 123/198 F, 198 DB, 90.16
See application file for complete search history.

(56) References Cited

U.S. PATENT DOCUMENTS

| | | | |
|---|---|---|---|
| 4,436,060 A | | 3/1984 | Tanaka et al. |
| 5,368,000 A | * | 11/1994 | Koziara ....................... 123/481 |
| 5,490,486 A | | 2/1996 | Diggs |
| 6,158,218 A | * | 12/2000 | Herold et al. .................. 60/609 |
| 6,520,140 B2 | * | 2/2003 | Dreymuller et al. ...... 123/198 F |
| 6,557,518 B1 | | 5/2003 | Albertson et al. |
| 6,874,463 B1 | * | 4/2005 | Bolander et al. .......... 123/198 F |
| 2002/0023615 A1 | * | 2/2002 | Dreymuller et al. ...... 123/198 F |
| 2004/0200445 A1 | * | 10/2004 | Tsukui et al. ............... 123/58.1 |
| 2005/0279320 A1 | * | 12/2005 | Roberts et al. ............ 123/198 F |
| 2007/0068486 A1 | * | 3/2007 | Rozario et al. ............... 123/306 |
| 2007/0119406 A1 | * | 5/2007 | Mc Donald et al. ...... 123/198 F |

FOREIGN PATENT DOCUMENTS

| | | |
|---|---|---|
| DE | 100 46 720 A1 | 5/2002 |
| EP | 0 980 965 A2 | 2/2000 |
| EP | 1 258 619 A2 | 11/2002 |
| EP | 1 270 882 A2 | 1/2003 |
| EP | 1 462 622 A1 | 9/2004 |
| JP | 56-088916 A | 7/1981 |
| JP | 2004-293379 A | 10/2004 |

* cited by examiner

Primary Examiner—Mahmoud Gimie
(74) Attorney, Agent, or Firm—Birch, Stewart, Kolasch & Birch, LLP

(57) ABSTRACT

A multicylinder internal combustion engine, which can simplify its control and is advantageous against thermal loads or vibrations includes a cylinder head with intake valves and exhaust valves arranged therein. Valve actuators are provided for openably operating the intake valves and exhaust valves, respectively. A cylinder head cover forms, in combination with the cylinder head, a valve actuator chamber with the valve actuators accommodated therein. At least some of the valve actuators are deactivatable to disable their corresponding cylinders. The multicylinder internal combustion engine is a V-shaped internal combustion engine provided with a front bank and rear bank. The cylinders on opposite ends in a direction of a crankshaft are set as full-time operating cylinders.

23 Claims, 12 Drawing Sheets

S5: 3-CYLINDER/4-VALVE MODE
S6: 2-CYLINDER/4-VALVE MODE
S7: 4-CYLINDER/4-VALVE MODE

MULTICYLINDER INTERNAL COMBUSTION ENGINE

CROSS-REFERENCE TO RELATED APPLICATIONS

This nonprovisional application claims priority under 35 U.S.C. § 119(a) on Patent Application No. 2006-256004, filed in Japan on Sep. 21, 2006, the entirety of which is incorporated herein by reference.

BACKGROUND OF THE INVENTION

1. Field of the Invention

The present invention relates to a multicylinder internal combustion engine, especially to a cylinder-deactivatable, multicylinder internal combustion engine.

2. Background of the Invention

For example, inline 4-cylinder engines include those capable of deactivating four engine valves, which each cylinder is provided with, selectively in combinations of one intake and exhaust valves and the other intake and exhaust valves. By providing an engine with a function that can selectively deactivate engine valves as mentioned above, the operation of the engine can be controlled in four patterns consisting in combination of a case that the intake and exhaust valve combinations are both closed, cases that the one intake and exhaust valve combination is closed and the other intake and exhaust valve combination is closed, respectively, and a case that the intake and exhaust valve combinations are both operated, all for each cylinder (See Japanese Patent Laid-open No. 2004-293379, for example).

The above-described conventional 4-cylinder engine is, however, accompanied by a problem in that its control becomes complex, because the four patterns of cylinder operation state exist and the deactivation state of the intake and exhaust valves in each cylinder exists in two patterns, one being the case that all of the intake and exhaust valves are disabled, and the other the case that some of the intake and exhaust valves are disabled.

SUMMARY OF THE INVENTION

An object of the present invention is, therefore, to provide a multicylinder internal combustion engine, which can simplify its control and is advantageous against thermal loads or vibrations.

To achieve the above-described object, a first aspect of the present invention is directed to a multicylinder internal combustion engine provided with a cylinder head (for example, cylinder heads 5, 6 according to an embodiment) with engine valves (for example, intake valves IV and exhaust valves EV according to an embodiment) arranged therein, valve actuators (for example, valve actuators 33 according to an embodiment) for openably operating the engine valves, respectively, and a cylinder head cover (for example, cylinder head covers 7, 8 according to an embodiment) forming, in combination with the cylinder head, a valve actuator chamber with the valve actuators accommodated therein, at least some of the valve actuators being deactivatable to disable their corresponding cylinders, the internal combustion engine is a V-shaped internal combustion engine provided with a front bank (for example, a front bank Bf in the embodiment) and rear bank (for example, a rear bank Br according to an embodiment), and the cylinders (for example, the cylinder #1 and cylinder #4 according to an embodiment) on opposite ends in a direction of a crankshaft (for example, a crankshaft 2 according to an embodiment) are set as full-time operating cylinders.

Owing to the construction as described above, the full-time operating cylinders are arranged such that their valves are not disabled. By disabling the valve actuators to deactivate all the engine valves, the cylinders are disabled so that the control can be simplified. Further, the full-time operating cylinders to which large thermal loads are applied are arranged on the laterally opposite end sides in the direction of the crankshaft, where the cylinders are readily exposed to running wind, so that the full-time operating cylinders can be effectively cooled by running wind.

According to a second aspect of the present invention, the cylinders located at laterally opposite ends in the front bank are set as full-time operating cylinders, and the cylinders in the rear bank (for example, the cylinder #2 and cylinder #3 in the embodiment) are set as deactivatable cylinders.

Owing to the construction as described above, the full-time operating cylinders to which large thermal loads are applied can be effectively cooled by running wind in the more forward side.

According to the third aspect of the present invention, the V-type internal combustion engine is to be mounted on a motorcycle.

Owing to the construction as described above, the full-time operating cylinders on the opposite end sides of the crankshaft or on the side of the front bank, said full-time operating cylinders being exposed to large thermal loads, can be effectively cooled by running wind in the motorcycle in which the internal combustion engine is exposed to the outside.

When the cylinders in the front bank are arranged on the opposite end sides of the crankshaft, running wind can be made flowable rearwards from a central part of the front bank so that the running wind is also allowed to flow to the cylinders in the rear bank located rearward.

A fourth aspect of the present invention is directed to a multicylinder internal combustion engine provided with a cylinder head with engine valves arranged therein, valve actuators for openably operating the engine valves, respectively, and a cylinder head cover forming, in combination with the cylinder head, a valve actuator chamber with the valve actuators accommodated therein, at least some of the valve actuators being deactivatable to disable their corresponding cylinders, the internal combustion engine is a V-shaped internal combustion engine provided with a front bank and rear bank, the cylinders on opposite ends in a direction of a crankshaft in the front bank (for example, the cylinder #1 and cylinder #4 according to an embodiment) are set as the deactivatable cylinders, and the cylinders in the rear bank (for example, the cylinder #2 and cylinder #3 according to an embodiment) are set as full-time operating cylinders.

Owing to the construction as described above, the full-time operating cylinders are arranged such that their valves are not disabled. By disabling the valve actuators to deactivate all the engine valves, the cylinders are disabled so that their control can be simplified. By setting as full-time operating cylinders the cylinders arranged closer to an inner side of the crankshaft, vibrations can be kept low even when one of the opposite end cylinders in the front bank is disabled.

According to a fifth aspect of the present invention, the internal combustion engine is a V-shaped 4-cylinder internal combustion engine, and a number of operating cylinders is selectively changeable in three patterns.

Owing to the construction as described above, the number of operating cylinders is limited to three patterns so that the control can be simplified.

A sixth aspect of the present invention is directed to a multicylinder internal combustion engine provided with a cylinder head (for example, the cylinder head 6 according to an embodiment) with engine valves (for example, intake valves IV and exhaust valves EV according to an embodiment) arranged therein, valve actuators (for example, valve actuators 33 according to an embodiment) for openably operating the engine valves, respectively, and a cylinder head cover (for example, the cylinder head cover 8 according to an embodiment) forming, in combination with the cylinder head, a valve actuator chamber with the valve actuators accommodated therein, at least some of the valve actuators being deactivatable to disable their corresponding cylinders, the internal combustion engine is an inline internal combustion engine, the two cylinders (for example, the cylinder #2 and cylinder #3) at a central part in a longitudinal direction of a crankshaft (for example, a crankshaft 2 according to an embodiment) are constructed as full-time operating cylinders that are fired at equal intervals, the cylinders (for example, the cylinder #1 and cylinder #4 according to an embodiment) on opposite end sides of the crankshaft are constructed as deactivatable cylinders, respectively, and an operation mode of the inline internal combustion engine is selectively changeable to one of operation modes consisting of an operation mode in which one of the deactivatable cylinders on the opposite end sides of the crankshaft is disabled, another operation mode in which both of the deactivatable cylinders are disabled, and a further operation mode in which both of the deactivatable cylinders are operated.

Owing to the construction as described above, the full-time operating cylinders are arranged such that their valves are not disabled. By disabling the valve actuators to deactivate all the engine valves, the cylinders are disabled so that their control can be simplified. As the two cylinders at the central part in the longitudinal direction of the crankshaft are constructed as full-time operating cylinders and are set to are fired at equal intervals, vibrations can be kept low even when one of the cylinders on the opposite end sides of the crankshaft is disabled.

According to a seventh aspect of the present invention, the internal combustion engine is an inline 4-cylinder internal combustion engine.

Owing to the construction as described above, the two cylinders at the central part are constructed as full-time operating cylinders and are set to are fired at equal intervals. Vibrations can be kept low even when one of the deactivatable cylinders on the opposite end sides is disabled.

According to an eighth aspect of the present invention, the deactivatable cylinders are the cylinders located on the opposite end sides of the crankshaft.

Owing to the construction as described above, the cylinders located on the opposite end sides of the crankshaft are set as deactivatable cylinders by adopting the vibrationally-balanced arrangement that firing is performed at equal intervals in the central part.

According to the first aspect of the present invention, the full-time operating cylinders are arranged such that their valves are not disabled. By disabling the valve actuators to deactivate all the engine valves, the cylinders are disabled. It is, therefore, possible to bring about advantageous effects that the control can be simplified and the operation can be promptly switched. Further, the full-time operating cylinders to which large thermal loads are applied are arranged on the laterally opposite end sides in the direction of the crankshaft and therefore, can be effectively cooled by running wind. It is, hence, possible to bring above a further advantageous effect that the engine can be effectively cooled.

According to the second aspect of the present invention, the full-time operating cylinders to which large thermal loads are applied can be effectively cooled on the more front side. It is, therefore, possible to bring about an advantageous effect that the engine can be effectively cooled.

According to the third aspect of the present invention, in the motorcycle with the internal combustion engine exposed to the outside, the full-time operating cylinders on the opposite end sides of the crankshaft or on the side of the front bank, said full-time operating cylinders being subjected to large thermal loads, can be effectively cooled by running wind. It is, therefore, possible to bring about an advantageous effect that the engine can be effectively cooled.

Further, when the cylinders in the front bank are arranged on the opposite end sides of the crankshaft, running wind is also allowed to flow to the cylinders in the rear bank located rearward by designing such that the running wind flows rearward through the central part of the front bank. The engine can, therefore, be cooled still more effectively.

According to the fourth aspect of the present invention, the full-time operating cylinders are arranged such that their valves are not disabled. The valve actuators are disabled to deactivate all the engine valves. It is, therefore, possible to bring about advantageous effects that the control can be simplified and the operation can be promptly switched. By arranging the cylinders, which are arranged closer to an inner side of the crankshaft, as full-time operating cylinders in the rear bank, vibrations can be kept low even when one of the opposite end cylinders in the front bank is disabled. It is, therefore, possible to bring about an advantage that the commercial value can be heightened.

According to the fifth aspect of the present invention, the number of operating cylinders is limited to three patterns so that the control can be simplified. It is, therefore, possible to bring about an advantageous effect that the operation can be promptly switched.

According to the sixth aspect of the present invention, the full-time operating cylinders are arranged such that their valves are not disabled. By disabling the valve actuators to deactivate all the engine valves, the cylinders are disabled. It is, therefore, possible to bring about advantageous effects that the control can be simplified and the operation can be promptly switched.

Further, the two cylinders in the central part in the longitudinal direction of the crankshaft are set as full-time operating cylinders and are constructed to be fired at equal intervals. Vibrations can, therefore, be kept low even when one of the deactivatable cylinders on the opposite end sides of the crankshaft is disabled. It is, therefore, possible to bring about an advantage that the commercial value can be heightened.

According to the seventh aspect of the present invention, the two cylinders in the central part are set as full-time operating cylinders and are constructed to are fired at equal intervals. Vibrations can, therefore, be kept low even when one of the deactivatable cylinders on the opposite end sides is disabled. It is, therefore, possible to bring about an advantage that the commercial value can be heightened.

According to the eighth aspect of the present invention, the cylinders located on the opposite end sides of the crankshaft are set as deactivatable cylinders by adopting the vibrationally-balanced arrangement that firing is performed at equal intervals in the central part. It is, therefore, possible to bring about an advantage that the commercial value can be heightened.

Furthermore, since the intake duct on the first side includes the opening/closing valve opening and closing the opening of the intake duct, the opening/closing valve can be arranged easily in the intake duct, so that the duct area can be varied.

Moreover, the air cleaner is disposed adjacent to the lower portion of the main tube extended in the fore and aft direction of the vehicle body, the resonator provided on the expansion chamber is disposed on the side of the main tube on the upper surface of the air cleaner case, the pair of intake ducts are provided on the left and right sides of the air cleaner case, and the resonators are individually provided on the pair of intake ducts. Accordingly, the resonators can be arranged at the positions where the interference thereof with the main tube is avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
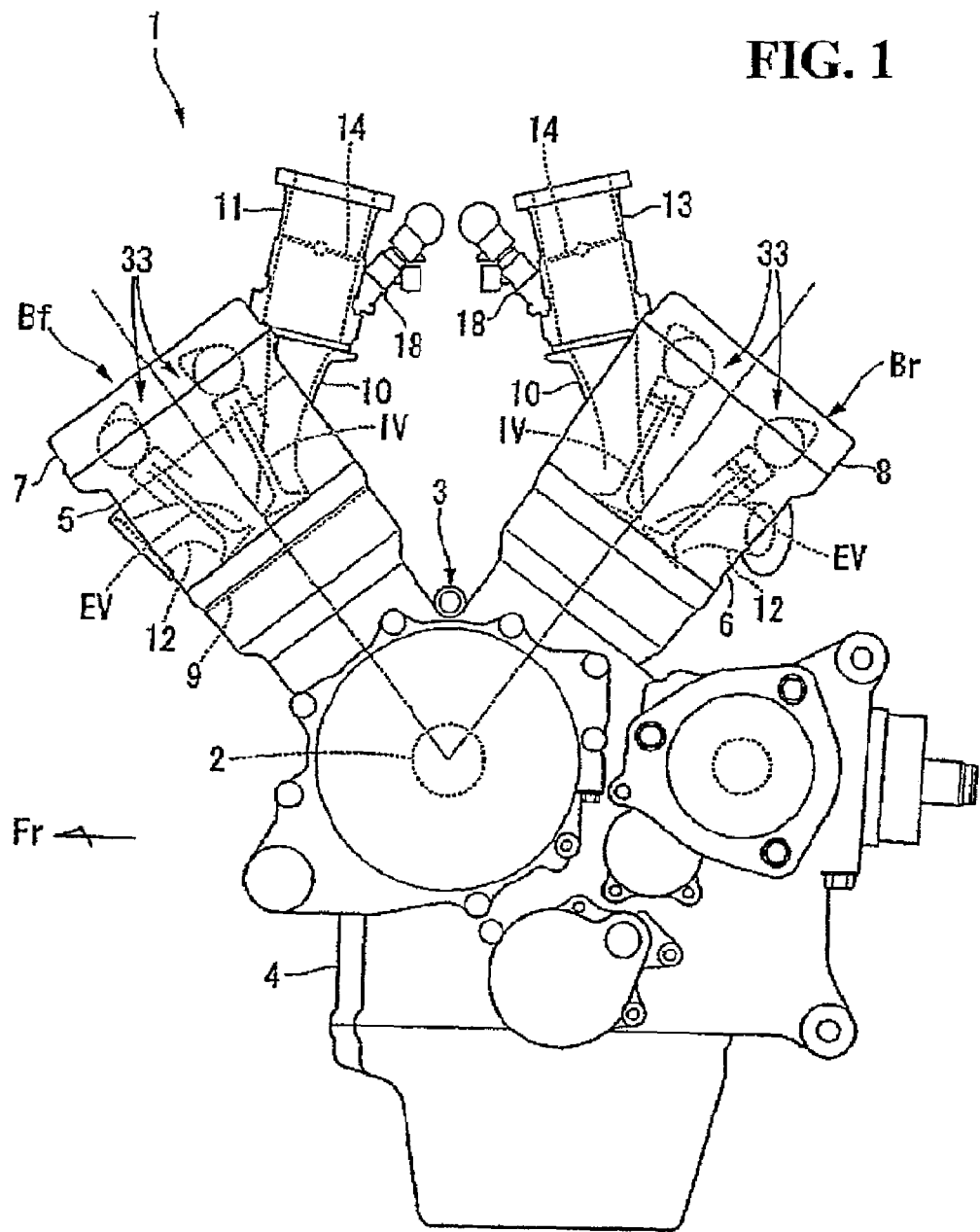
FIG. 1 is a side view of a V-type 4-cylinder engine according to an embodiment of the present invention.

The present invention will now be described in detail with reference to the accompanying drawings, wherein the same reference numerals will be used to identify the same or similar elements throughout the several views.

Figure 2:
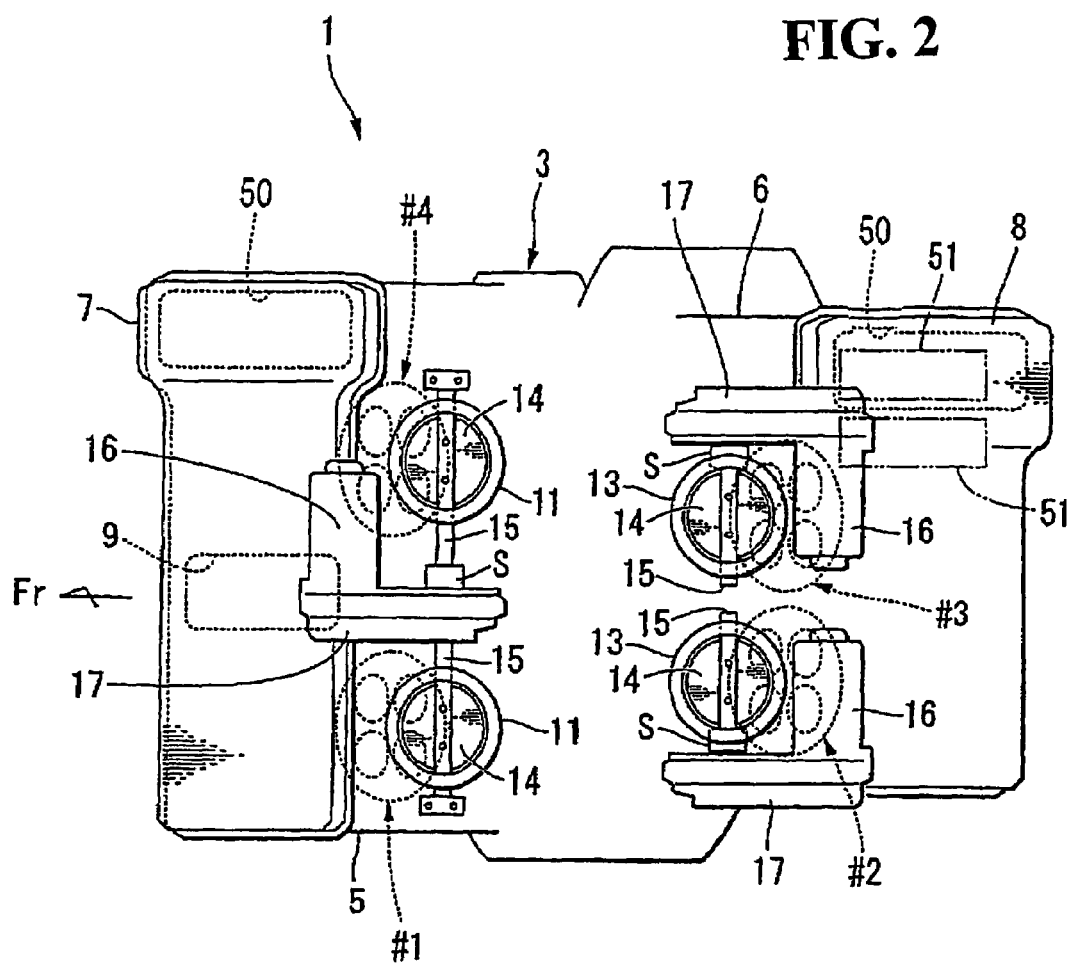
FIG. 2 is a schematic plan view of the embodiment of the present invention.

As illustrated in FIG. 1 and FIG. 2, a four-stroke cycle DOHC engine 1 to be mounted on a motorcycle (not shown) is a laterally-mounted, V-type 4-cylinder engine that has a crankshaft 2 arranged along a lateral direction. A front bank Bf, which is a train of two cylinders on a front side, and a rear bank Bf, which is a train of two cylinders on a rear side, define a contained angle of approximately 72 degrees in a front-to-rear direction. It is to be noted that sign Fr indicates a forward side of the vehicle. Each cylinder is equipped with two intake valves IV and two exhaust valves EV to be described subsequently herein. The engine 1 is provided with a cylinder block 3, a crankcase 4 mounted integrally on a lower wall of the cylinder block 3, a cylinder head 5 mounted on an upper part of the cylinder train on the front side of the cylinder block 3, a cylinder head 6 mounted on an upper part of the cylinder train on the rear side of the cylinder block, and cylinder head covers 7, 8 covering these cylinder heads 5, 6. The intake valves IV and exhaust valves EV are arranged in the respective cylinder heads 5, 6. Between the cylinder heads 5, 6 and cylinder head covers 7, 8, valve actuator chambers are formed to accommodate valve actuators 33 to be described subsequently herein. An opening 9 is formed through the front bank Bf at a central part thereof in the direction of the crankshaft, so that by allowing air to enter through the opening 9, running wind flows toward the rear bank Br.

Upwardly-extending intake manifolds 10 are arranged corresponding to the respective cylinders on a rear part of the front bank Bf. Throttle bodies 11 are attached to the respective intake manifolds 10. Upwardly-extending intake manifolds 10 are also arranged corresponding to the respective intake manifolds 10 on a front part of the rear bank Br. Throttle bodies 13 are attached to the respective intake manifolds 10.

Butterfly throttle valves 14 are arranged openably and closably within the respective throttle bodies 11, 13. Exhaust pipes (not shown) are connected to exhaust manifolds 12 of the respective cylinder heads 5, 6. Each throttle valve 14 is of the so-called electronic throttle control type that in accordance with a throttle grip opening degree θg (degrees), in other words, an acceleration intent or the like of the operator, it is operated to open or close in association with a motor. In addition, a throttle valve opening sensor S which detects a throttle valve opening degree TH is arranged in association with each throttle valve 14 to permit detection of an accurate rotation angle of the throttle valve 14 driven by the motor (see FIG. 5).

A motor 16, provided between the shafts 15, 15, is connected to shafts 15, 15 of the respective throttle valves 14, 14 in the front bank Bf, via a speed reduction mechanism 17 to drive both of the shafts 15, 15 at the same time. Therefore, the respective throttle valves 14 are simultaneously operated to open or close by the single motor 16. Further, opening degrees of both of the throttle valves 14, 14 are detected by throttle valve opening degree sensor S arranged on the shaft 15.

Motors 16, 16 are connected to shafts 15, 15 of the respective throttle valves 14, 14 in the rear bank Br, via speed reduction mechanisms 17, 17, respectively. Opening degrees of the individual throttle valves 14 are detected by throttle valve opening degree sensors S arranged for the respective throttle valves 14. In rear walls of the respective throttle bodies 11 in the front bank Bf, injectors 18 are obliquely inserted and fixed toward the cylinder heads 5 to inject fuel into the intake manifolds 10. Injectors 18 of similar construction are also inserted and fixed obliquely toward the cylinder heads 6 in front walls of the respective throttle bodies 13 in the rear bank Br.

Figure 3:
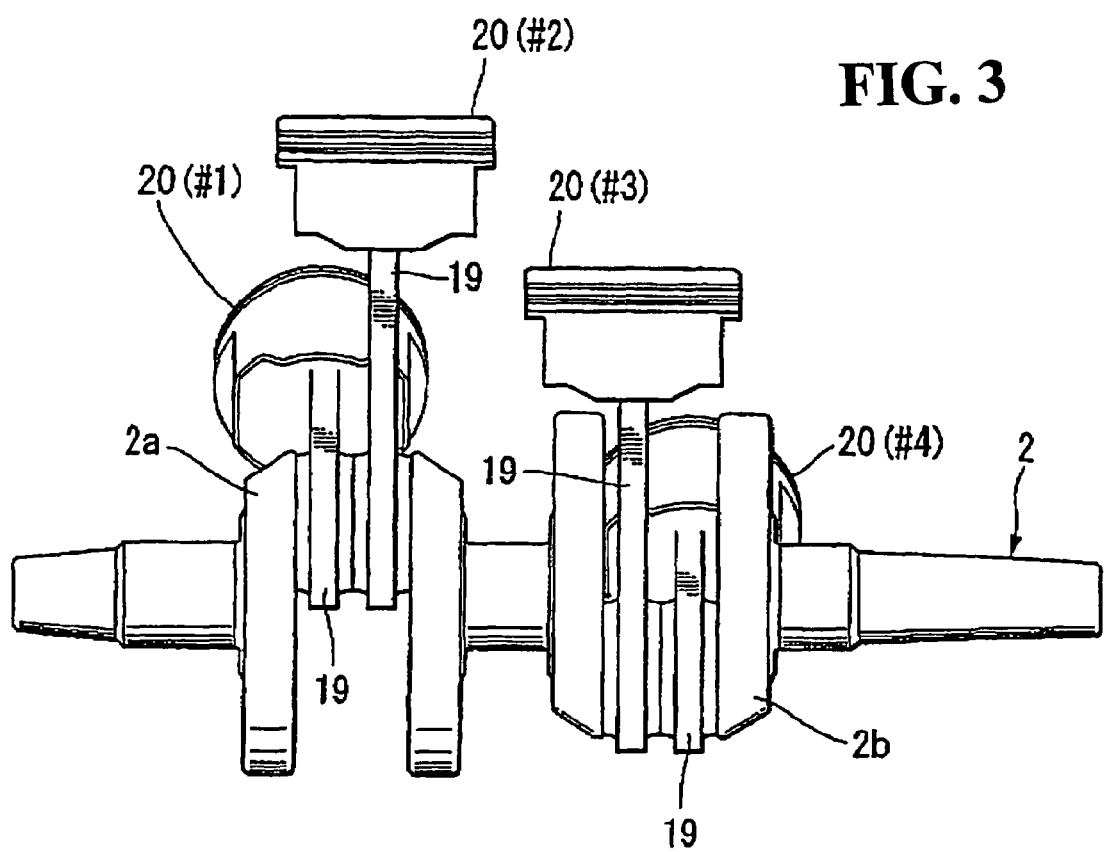
FIG. 3 is a side view of a crankshaft in the embodiment of the present invention.

As depicted in FIG. 3, the crankshaft 2 is provided with crankpins 2a, 2b phase shifted over approximately 180 degrees. Two connecting rods 19, 19 are supported on the crank pin 2a, and two connecting rods 19, 19 are supported on the crank pin 2b. Cylinders with these pistons 20 accommodated therein are arranged as the cylinder #1, cylinder #2, cylinder #3 and cylinder #4 in this order from the left side in FIG. 3 (the left side of a vehicle body). In this V-type 4-cylinder engine, the left side and right side of the front bank Bf are, therefore, the cylinder #1 and the cylinder #4, respectively. The left side and right side of the rear bank Br are, therefore, the cylinder #2 and the cylinder #3, respectively.

A description will next be made about the firing order of the cylinders when all the cylinders are operated. When the cylinder #1 is fired in the front bank Bf, the cylinder #3 is fired 104 degrees after that, the cylinder #4 is then fired 256 degrees after, the #2 cylinder is finally fired 104 degrees after, and 256 degrees after, the cylinder #1 is fired again.

Accordingly, the cylinder #1 and cylinder #4 are ignited at equal intervals, and the cylinder #2 and cylinder #3 are also ignited at equal intervals.

Each cylinder is provided with two intake valves IV and two exhaust valves EV. The cylinder #1 and cylinder #4 are constructed as full-time operating cylinders, while the cylinder #2 and cylinder #3 are constructed as deactivatable cylinders. Therefore, as illustrated in FIG. 1, the engine valves for the cylinder #1 (also for the cylinder #4) consist of two combinations of full-time on/off operating, intake valves IV and exhaust valves EV, and the engine valves for the cylinder #2 (also for the cylinder #3) consist of two combinations of intake valves IV and exhaust valves EV provided with valve-deactivating mechanisms to be described subsequently.

A description will hereinafter be made taking as an example the cylinder #2 equipped with a valve-deactivating mechanism. It is to be noted that the description will be made centering around the intake valve IV and exhaust valve EV arranged on a diagonal line of the cylinder #2. Accordingly, a description about the intake valve IV and exhaust valve EV of similar constructions arranged on the other diagonal line is omitted. A description about the cylinder #1 and cylinder #4, which are ordinary cylinders equipped with the intake valves IV and exhaust valves EV provided with no valve-deactivating mechanisms, is also omitted.

The cylinder head 6 of the cylinder #2 has a concave part 22, which forms a combustion chamber 21 in combination with the cylinder block 3 and piston 20. Two intake valve openings 23 and two exhaust valve openings 24 are formed in the concave part 22. The intake valve openings 23 are opened and closed by the intake valves IV, while the exhaust valve openings 24 are opened and closed by the exhaust valves EV. It is to be noted that the intake valves IV and exhaust valves EV all have a deactivatable construction.

Each intake valve IV is formed of a valve head 25, which can close its corresponding intake valve opening 23, and a valve stem 26. A basal end of the intake valve IV is arranged integrally and in continuation with the valve head 25. Each exhaust valve EV is constructed of a valve head 27, which can close its corresponding exhaust valve opening 24, and a valve stem 28. A basal end of the exhaust valve EV is arranged integrally and in continuation with the valve head 27.

The valve stem 26 of the intake valve IV is slidably fitted in a guide cylinder 29 arranged in the cylinder head 5. The valve stem 28 of the exhaust valve EV is slidably fitted in a guide cylinder 30 arranged in the cylinder head 5.

A retainer 31 is fixedly secured on a portion of the valve stem 26 for the intake valve IV, the portion extending upwardly from the guide cylinder 29. The intake valve IV is biased in a direction to close the intake valve opening 23 by a coil-shaped valve spring 32 arranged between the retainer 31 and the cylinder head 6. Similarly, the exhaust valve EV is biased in a direction to close the exhaust valve opening 24 by a coil-shaped valve spring 32 arranged between a retainer 31 fixedly secured on the valve stem 28 for the exhaust valve EV and the cylinder head 6.

The intake valve IV for each combustion chamber 21 is operated to open and close by the valve actuator 33. This valve actuator 33 has a camshaft 35 with a valve cam 34 arranged corresponding to the associated intake valve IV, and is also equipped with a closed-bottom, cylindrical valve lifter 36 slidably driven by the valve cam 34. The exhaust valves EV and intake valves IV are all operated to open or close by their corresponding valve actuators 33 of a similar construction. Each valve actuator 33 has a camshaft 35, on which a valve cam 34 corresponding to the exhaust valve EV is arranged, and is also provided with a closed-bottom cylindrical valve lifter 36 slidably driven by the valve cam 34.

The camshaft 35 has an axis line orthogonal to an extension of an axis line of the valve stem 26 of the intake valve IV, and is rotatably supported between the cylinder head 6 and the cylinder head cover 8 connected to the cylinder head 6. In the cylinder head 6, the valve lifter 36 is slidably fitted in a direction coaxial with the axis line of the valve stem 26 of the intake valve IV, and the valve lifer 36 is in sliding contact on an outer wall of its closed end with the valve cam 34.

A valve deactivating mechanism 37 is arranged between the valve stem 26 of the intake valve IV and the valve lifter 36. The valve deactivating mechanism 37 can selectively set an application or non-application of a pressing force in a valve-opening direction from the valve lifter 36 to the intake valve IV, and in a particular an operation range of the engine 1, for example, in a low load range such as a low-speed operation range, the pressing force is controlled in a non-applied state so that the intake valve IV is maintained in a disabled state irrespective a sliding motion of the valve lifter 36.

Similar to the camshaft 35 on the side of the intake valve IV, the camshaft 35 on the side of the exhaust valve EV also has an axis line orthogonal to an extension of an axis line of the valve stem 28 of the exhaust valve EV, and is rotatably supported between the cylinder head 6 and the cylinder head cover 8 connected to the cylinder head 6. In the cylinder head 6, the valve lifter 36 is slidably fitted in a direction coaxial with the axis line of the valve stem 28 of the exhaust valve EV, and the valve lifer 36 is in sliding contact on an outer wall of its closed end with the valve cam 34.

A valve deactivating mechanism 37 is arranged between the valve stem 28 of the exhaust valve EV and the valve lifter 36. The valve deactivating mechanism 37 can selectively set an application or non-application of a pressing force in a valve-opening direction from the valve lifter 36 to the exhaust valve EV, and in a particular operation range of the engine 1, for example, in a low load range such as the low-speed operation range, a pressing force is controlled in a non-applied state so that the exhaust valve EV is maintained in a disabled state irrespective a sliding motion of the valve lifter 36.

Taking the side of the intake valve IV as an example, a description will next be made about the valve deactivating mechanism 37.

The valve deactivating mechanism 37 is provided with a pin holder 40, which is fitted in the valve lifter 36 and is slidable in an axial direction. It is to be noted that a valve spring 38 is arranged between the pin holder 40 and the cylinder head 6 to bias the pin holder 40 in an upward direction. The pin holder 40 has an insertion hole with the valve stem 26 inserted therethrough and a slide hole orthogonal to the insertion hole. A slide pin 41 is slidably inserted through the slide hole. The slide pin 41 is biased at an end thereof by a return spring 42. At an opposite end of the slide pin 41, a hydraulic pressure chamber 43 is formed and the slide pin 41 is maintained in contact with a stopper pin 44 arranged in the hydraulic pressure chamber 43.

A receiving bore 45 is formed through the slide pin 41, such that it is coaxially in communication with the insert hole of the pin holder 40 in a state that the slide pin 41 is biased by the return spring 42 and is in contact with the stopper pin 44 and in a stopped state. An oilway 46 in the cylinder head 6 is in communication with the hydraulic pressure chamber 43 in the slide hole of the pin holder 40.

At the time of non-operation when the hydraulic pressure acting on the slide pin 41 is low, the slide pin 41 comes into contact with the stopper pin 44 and stops under the biasing force of the return spring 42, so that an upper end portion of the valve stem 26 inserted in the insert hole of the pin holder 40 is in a state ready to be received in the receiving bore 45. Even when the valve lifter 36 is pressed downwardly together with the pin holder 40 as a result of a rotation of the valve cam 34, the upper end portion of the valve stem 26 is, therefore, received in the receiving bore 45 so that no pressing force acts on the intake valve IV to maintain it in a disabled state that a valve-closed state is maintained.

At the time of operation when the hydraulic pressure acting on the slide pin 41 is high, on the other hand, the slide pin 41 slides against the biasing force of the return spring 42 under the pressure oil and closes the opening of the insert hole of the pin holder 40. The upper end portion of the valve stem 26 inserted in the insert hole, therefore, comes into contact with the slide pin 41. When the valve lifter 36 is pressed downwardly together with the pin holder 40 as a result of a rotation of the valve cam 34, a pressing force, hence, acts on the intake valve IV via the slide pin 41 to open the intake manifold 10, and the intake valve IV is operated on and off in accordance with reciprocations of the valve lifter 36.

Other valve deactivating mechanisms 37 similar to those described above are also arranged likewise for the exhaust valves EV. At the time of cylinder deactivation, all the valve deactivating mechanisms 37 operate, and all the four valves, that is, the intake valves IV and exhaust valves EV close the intake manifolds 10 and exhaust manifolds 12. It is to be noted that the cylinder #3 is provided with the same valve deactivating mechanism 37 as the cylinder #2.

Upon disabling any cylinder by its corresponding valve deactivating mechanism 37, there is performed so-called "fuel cutoff" where the feeding of fuel from the injector 18 is stopped, and the throttle valve 14 is brought into a fully-closed position via the motor 16 and speed reduction mechanism 17.

Therefore, the cylinder #1 and cylinder #4 which constitute the front bank Bf of the engine 1 both become full-time operating cylinders that none of their engine valves are disabled. On the other hand, the cylinder #2 and cylinder #3 which constitute the rear bank Br become deactivatable cylinders that the respective valve deactivating mechanisms 37 disable the intake valves IV and exhaust valves EV of the respective cylinders and all the engine valves are hence deactivated to disable the cylinders.

As depicted in FIG. 2, the respective cylinder heads 5, 6 are provided on their side walls on the sides of the cylinder #4 and cylinder #3 with cam chain cases 50, respectively. Within these cam chain cases 50, there are accommodated unillustrated cam chains for driving the camshafts 35, 35 in the intake-side and discharge-side valve actuators 33, 33 respectively. On an upper part of the cylinder head cover 8 in the rear bank Br, hydraulic control valves 51, 51 are mounted to feed working oil under control to the valve deactivating mechanisms 37, 37 in the intake-side and discharge-side valve actuators 33, 33, respectively.

Figure 5:
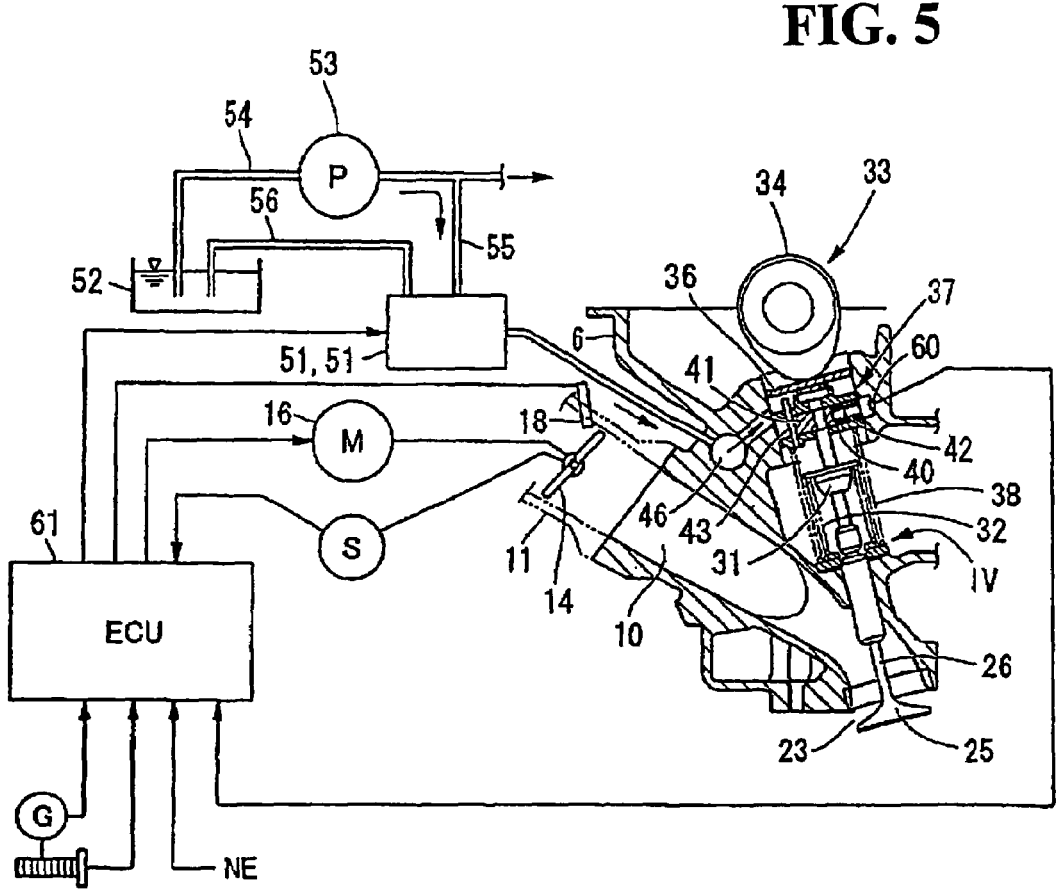
FIG. 5 is a system diagram of the embodiment of the present invention.

As shown in FIG. 5 by taking the intake side as an example, working oil stored in an oil pan 52 is fed to the hydraulic control valve 51 on the intake side (similarly to the exhaust side too). A main oilway 54 with a pump 53 arranged thereon is connected to the oil pan 52, and on a delivery side of the pump 53, a branch channel 55 to be connected to the hydraulic control valves 51, 51 branches out from the main oilway 54. Further, the working oil can be recovered into the oil pan 52 from a drain channel 56 via drain ports of the hydraulic control valves 51, 51.

Control of the hydraulic control valve 51, 51 is performed at ECU 61, which is an electronic control unit, on a basis of a throttle grip opening degree (hand throttle rotation) $\theta g$, an engine speed NE (rpm), a detection signal from a deactivation discriminating magnetic sensor 60, and the like. This deactivation discriminating magnetic sensor 60 is a sensor, which detects a distance from the deactivation discriminating magnetic sensor 60 to a wall portion of the slide pin 41, is equipped with a magnet and a coil, and by detecting the distance from a change in magnetic flux that occurs when the metal-made slide pin 41 moves, discriminates whether or not the cylinder is disabled.

To optimally set a throttle valve opening degree TH on the basis of a detection value from the throttle grip opening degree sensor G or the like, ECU 61 outputs a drive control signal to the corresponding motor 16 to control the throttle valve 14 while detecting the throttle valve opening degree TH by the throttle valve opening degree sensor S. Further, the injection quantity of fuel at the injector 18 is controlled based on a control signal from ECU 61. As described above, ECU 61 is provided with the means for switching the hydraulic control valves 51, 51, the means for controlling throttle valve openings TH and the means for controlling the injection quantities of fuel.

Figure 6:
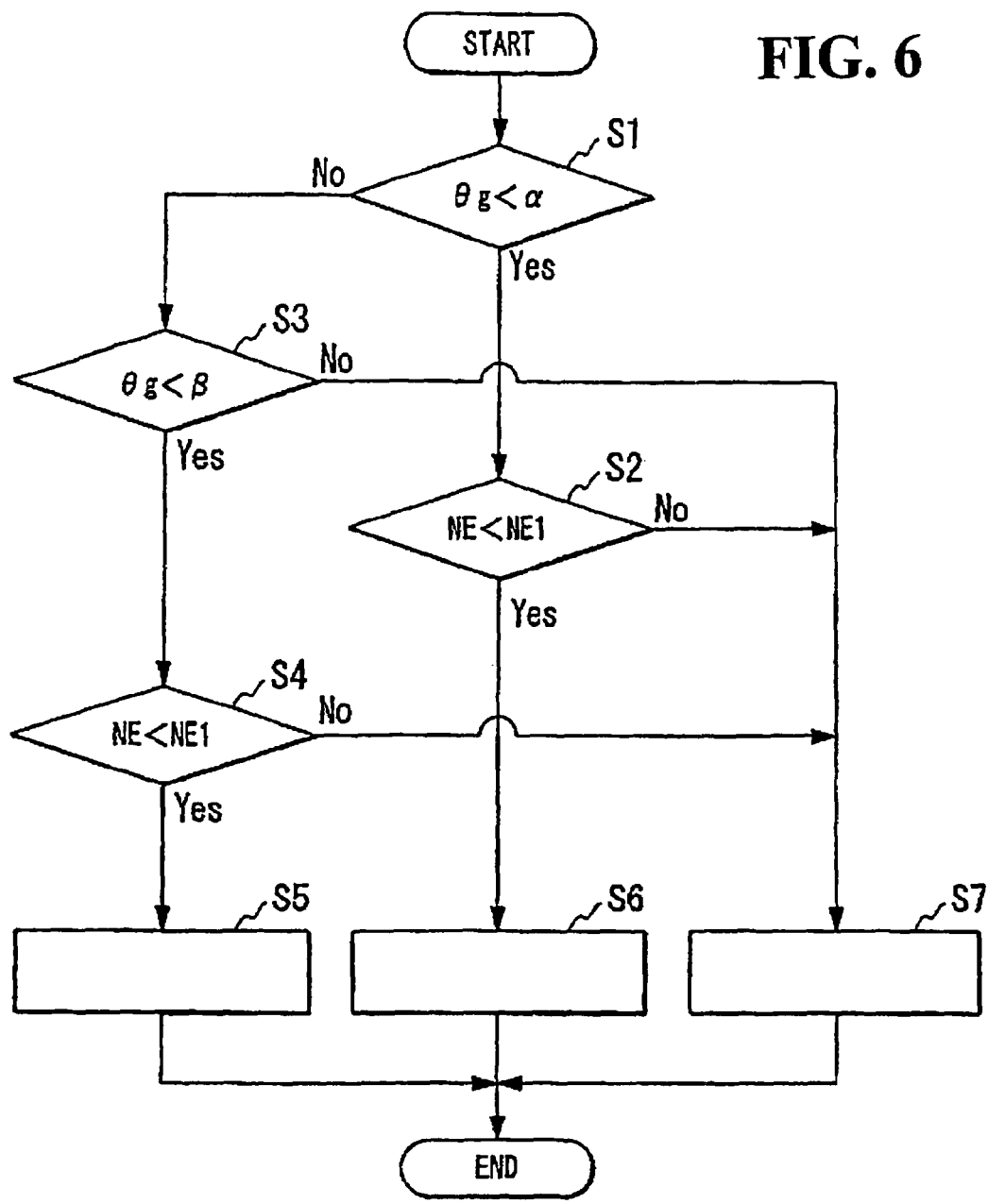
FIG. 6 is a flow diagram of the embodiment of the present invention.

Based on a flow chart of FIG. 6, a description will next be made about cylinder deactivation control performed by ECU 61.

Firstly, it is determined in step S1 whether or not a throttle grip opening degree $\theta g$ detected based on a detection signal from the throttle grip opening degree sensor G is smaller than a predetermined value $\alpha$ ($\alpha$=approximately 18 degrees). When the throttle grip opening degree $\theta g$ is smaller than the predetermined value $\alpha$ as a result of the determination in step S1, the routine advances to step S2. When the throttle grip opening degree $\theta g$ is equal to or greater than predetermined value $\alpha$, on the other hand, the routine advances to step S3.

In step S2, it is determined whether or not an engine speed NE is lower than a predetermined value NE1 (NE1=7,000 rpm). When the engine speed NE is lower than the predetermined value NE1 as a result of the determination in step S2, the routine advances to step S6, operation is performed in a 2-cylinder/4-valve mode (see FIG. 7 and FIG. 8(a)), and the processing is ended. It is to be noted that in FIG. 8, hatching indicates engine valves in a disabled state (the same shall apply equally to FIG. 9 and FIG. 10). This cylinder deactivation control is used in low-load ranges such as take-off, idling and cruising.

Namely, when the throttle grip opening degree $\theta g$ representing the operator's intent of an acceleration is small and the engine speed NE is also small, the motorcycle is ridden by disabling all the engine valves with respect to the cylinder #2 and cylinder #3, which are deactivatable cylinders in the rear bank Br, and operating only the cylinder #1 and cylinder #4 as the full-time operating cylinders in the front bank Bf.

Figure 7:
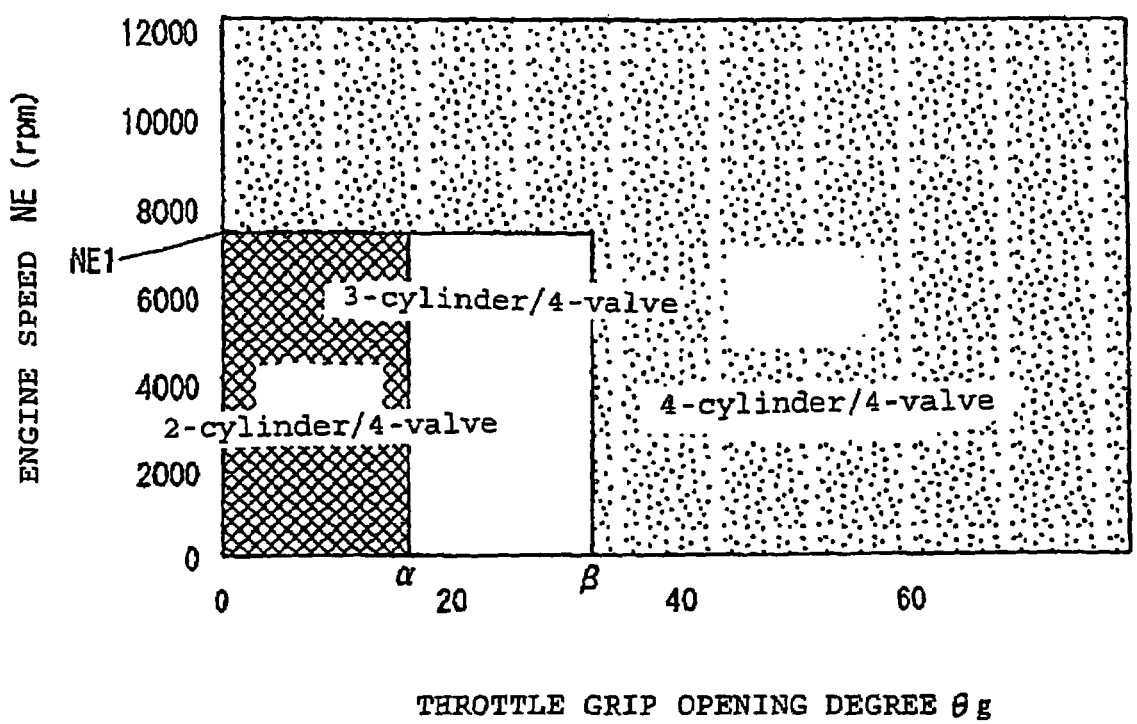
FIG. 7 is a graphic diagram of the embodiment of the present invention.
Figure 8A:
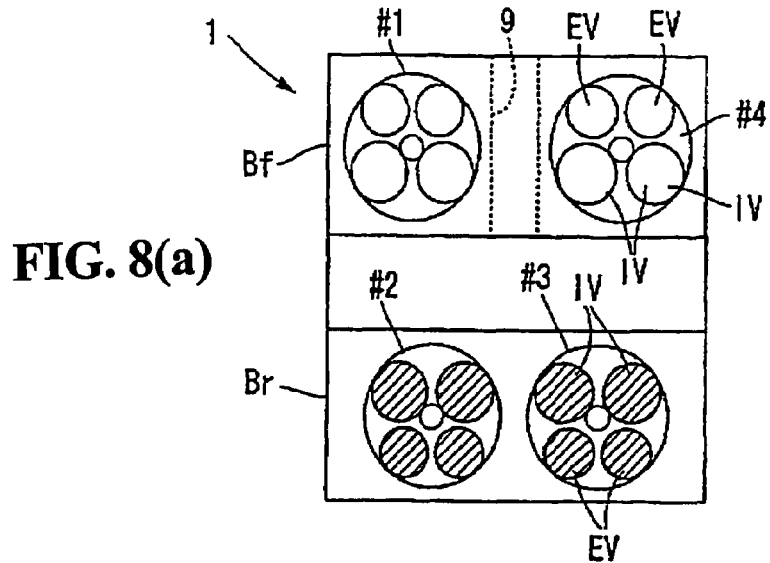
FIGS. 8(a) to 8(c) are plan views schematically illustrating operation modes of the embodiment of the present invention
Figure 8B:
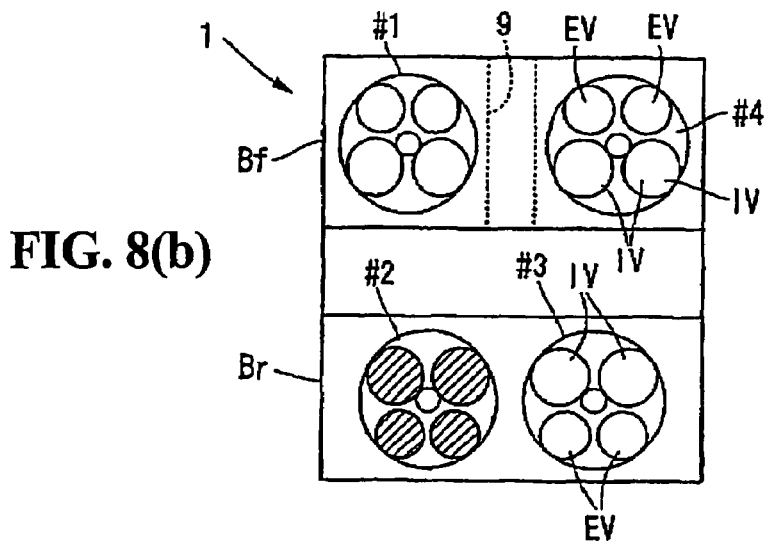
Figure 8C:
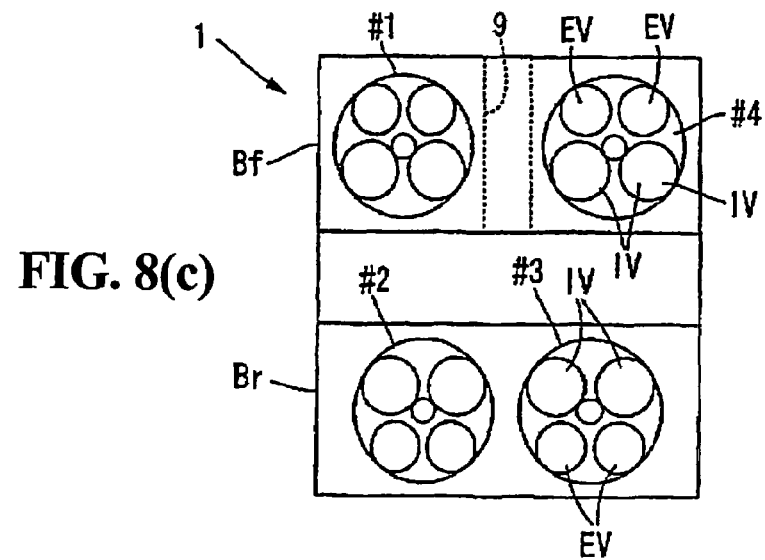

When the engine speed NE is equal to or higher than the predetermined value NE1 as a result of the determination in step S2, on the other hand, the routine advances to step S7 to perform operation in a 4-cylinder/4-valve mode (see FIG. 7 and FIG. 8(c)), and the processing is ended.

Namely, insofar as the engine speed NE is high (even when the throttle grip opening degree θg is small), operation is performed in the 4-cylinder/4-valve mode to operate the deactivatable cylinder #2 and cylinder #3 in the rear bank Br such that the current engine speed NE can be maintained by the cylinder #2 and cylinder #3 in combination with the cylinder #1 and cylinder #4 as full-time operating cylinders in the front bank Bf.

In step S3, it is determined whether or not the throttle grip opening degree θg is smaller than a predetermined value β (β=approximately 35 degrees). When the throttle grip opening degree θg is smaller than the predetermined value β as a result of the determination in step S3, the routine advances to step S4. When the throttle grip opening degree θg is equal to or greater than the predetermined value β, on the other hand, the routine advances to step S7.

In step S4, it is determined whether or not the engine speed NE is lower than the predetermined value NE1 (NE1=7,000 rpm). When the engine speed NE is lower than the predetermined value NE1 as a result of the determination in step S4, the routine advances to step S5 to perform operation in a 3-cylinder/4-valve mode (see FIG. 7 and FIG. 8(b)), and the processing is ended. When the engine speed NE is equal to or higher than the predetermined value NE1 as a result of the determination in step S4, on the other hand, the routine advances to step S7.

Namely, in a range that the throttle grip opening degree θg is in a range of from the predetermined value α to the predetermined value β and the engine speed NE is lower than the predetermined value NE1, the operator's intent of an acceleration is not very strong but the running speed is need to be retained at a certain level. Accordingly, one of the deactivatable cylinder is operated and the other deactivatable cylinder is disabled, thereby making it possible to improve the fuel economy and to heighten the commercial value. Described specifically, in the 3-cylinder/4-valve mode, operation is performed with the left-side cylinder #2 in the rear bank Br being disabled and with the cylinder #3 in the rear bank Br being operated.

Upon changing to the 3-cylinder/4-valve mode in step S5, the 2-cylinder/4-valve mode in step S6 or the 4-cylinder/4-valve mode in step S7, it is determined whether or not the preceding mode was the same mode. When it was the same mode, the operation is performed in the same mode. When the preceding mode was different from the current mode, the mode is changed to the current mode after changing processing is gradually performed. Described specifically, when changing to a mode that the number of operating cylinders is decreased, processing is performed to gradually close the throttle valve 14 via the motor 16 for the cylinder to be disabled, and then, the intake and exhaust valves IV, EV are brought into disabled states from operating states, respectively. When changing to a mode that the number of cylinders to be operated increases, on the other hand, processing is performed to gradually open the throttle valve 14 via the motor 16 for the cylinder to be operated, and then, the intake and exhaust valves IV, EV are brought into operating states from disabled states, respectively.

According to this embodiment, when the cylinder #1 and cylinder #4 in the front bank Bf are set as full-time operating cylinders that their intake and exhaust valves IV, EV are not disabled, the cylinder #2 and cylinder #3 in the rear bank Br are set as deactivatable cylinders, and the cylinder #2 and cylinder #3 are disabled, the four intake and exhaust valves IV, EV for each cylinder are all disabled and there is no mode that the four intake and exhaust valves IV, EV for each cylinder are disabled in part. Accordingly, the control can be simplified, the processing load of ECU 61 can be reduced, and the operation can be promptly switched.

Further, the cylinder #1 and cylinder #4, which are full-time operation cylinders subjected to large thermal loads, can be arranged on the laterally-opposite end sides in the direction of the crankshaft to effectively cool them by running wind. The engine can, therefore, be cooled effectively.

By setting the cylinder #1 and cylinder #4, which are located in the front bank Bf and on laterally-opposite end sides, as full-time operating cylinders and setting the cylinder #2 and cylinder #3 in the rear bank Br as deactivatable cylinders, the cylinder #1 and cylinder #4 to which large thermal loads are applied can be effectively cooled by running wind on a more forward side, and therefore, the engine 1 can be effectively cooled.

In particular, this V-type 4-cylinder engine 1 is mounted on the motor cycle exposed to the outside. The cylinder #1 and cylinder #4, which are arranged on laterally-opposite end sides of the crankshaft 2 and in the front bank Bf, can hence be effectively cooled by running wind.

Further, the opening 9 is arranged in the central part of the front bank Bf arranged on the laterally-opposite end sides of the crankshaft 2, in other words, between the cylinder #1 and the cylinder #4. Accordingly, running wind is allowed to flow rearwards from the opening 9, and the running wind is also allowed to flow to the cylinder #2 and cylinder #3 in the rear bank Br located rearward. It is, therefore, possible to cool the engine 1 still more effectively.

When the above-mentioned V-type 4-cylinder engine 1 is operated, the pattern of the number of operating cylinders is limited to the three kinds as shown in FIG. 8 and does not adopt, for example, such a pattern that in the deactivatable cylinders, some of the intake and exhaust valves IV, EV are disabled. The control can, therefore, be simplified. Accordingly, operation can be promptly switched to each of the modes. By gradually effecting a change upon changing operation of each mode, variations in the output of the engine 1 can be reduced to permit a smooth change.

It is only necessary to arrange the three motors 16, the three speed reduction mechanisms 17, and the three throttle valve opening degree sensors S. Accordingly, the number of parts can be reduced to achieve a cost reduction.

A second embodiment of the present invention will next be described based on FIG. 9 while also making reference to FIG. 1.

Similarly to the first embodiment, this second embodiment is also directed to a V-type 4-cylinder engine 1' provided with cylinder heads 5, 6 with intake and exhaust vales IV, EV arranged therein, valve actuators 33 for openably operating the intake and exhaust valves IV, EV, respectively, and cylinder head covers 7, 8 forming, in combination with the cylinder heads 5, 6, a valve actuator chamber with the valve actuators 33 accommodated therein, at least some of the valve actuators 33 being deactivatable to disable their corresponding cylinders. The V-type 4-cylinder engine 1' is provided with a front bank Bf and rear bank Br. The cylinders on opposite ends in a direction of a crankshaft 2 are set as the deactivatable cylinders in the front bank Bf, and full-time operating cylinders are set in the rear bank Br.

Described specifically, the cylinder #1 and cylinder #4 are arranged in the front bank Bf, while the cylinder #2 and cylinder #3 are arranged in the rear bank Br. The cylinder #1 and cylinder #4 in the front bank Bf are deactivatable cylinders, and the cylinder #2 and cylinder #3 in the rear bank Br are set as full-time operating cylinders. Each cylinder is of the 4-valve type that the intake valves IV and exhaust valves EV are arranged in two combinations. The cylinder #1 and cylinder #4 as deactivatable cylinders are provided with valve deactivating mechanisms 37, but the cylinder #2 and cylinder #3 as full-time operating cylinders are provided with no valve deactivating mechanisms 37. Further, the cylinder #1 and cylinder #4, which are provided with the valve deactivating mechanisms 37, are provided with two operation modes, one being that all the intake and exhaust valves IV, EV of both of the cylinders are disabled, and the other that all the intake and exhaust valves IV, EV of both of the cylinders operate.

Figure 9A:
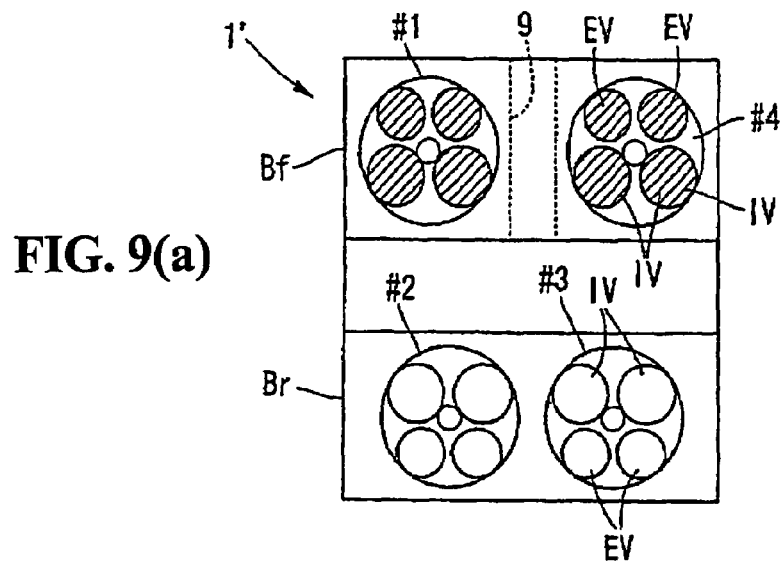
FIG. 9(a) to 9(c) are plan views schematically illustrating operation modes of a second embodiment of the present invention.
Figure 9B:
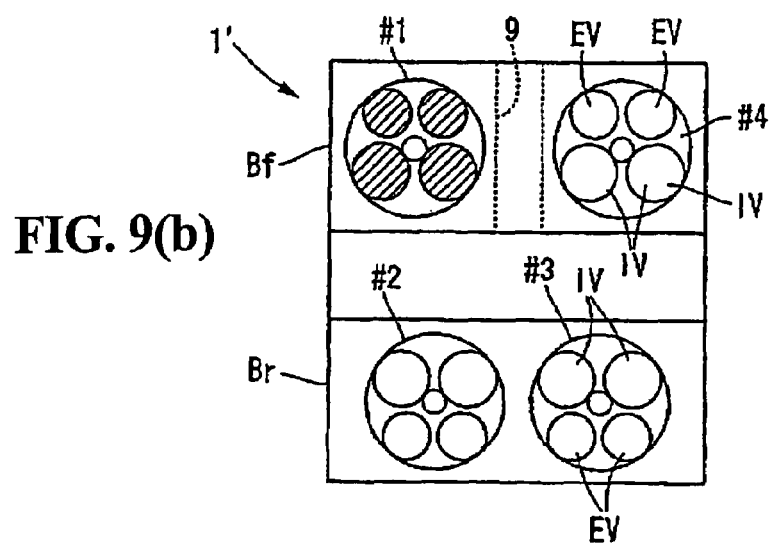
Figure 9C:
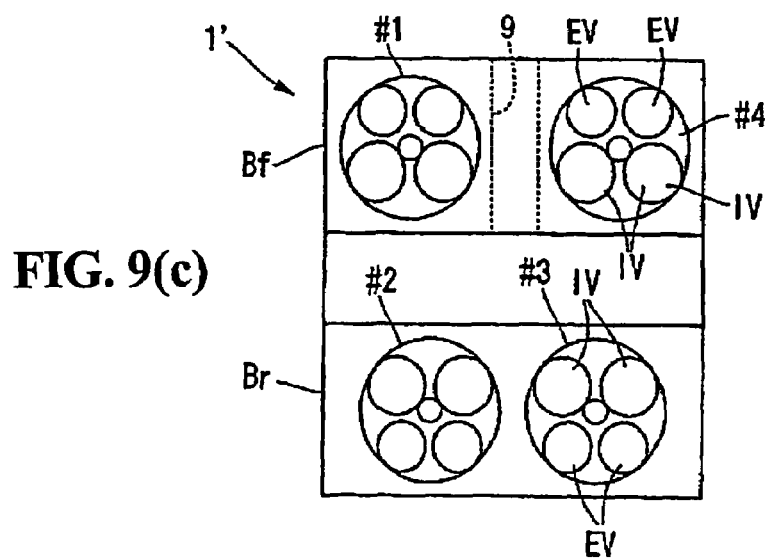

When the above-mentioned V-type 4-cylinder engine 1' is operated, the pattern of the number of operating cylinders is limited to three kinds as depicted in FIG. 9. Specifically, they are a 2-cylinder/4-valve mode (see FIG. 9(a)), 3-cylinder/4-valve mode (see FIG. 9(b)), and 4-cylinder/4-valve mode (see FIG. 9(c)). The pattern of the number of operating cylinders does not adopt, for example, such a pattern that in the deactivatable cylinders, some of the intake and exhaust valves IV, EV are disabled. The control can, therefore, be simplified. Accordingly, the operation can be promptly switched to each mode.

The 3-cylinder/4-valve mode means operation that the cylinder #2 on the left side of the front bank Bf is disabled and the cylinder #3 in the front bank Bf is operated, the 2-cylinder/4-valve mode means operation that the cylinder #1 and cylinder #4 in the front bank Bf are disabled, and the 4-cylinder/4-valve mode means operation that the cylinder #1 and cylinder #4 in the front bank Bf are operated. It is to be noted that a description about switching control is omitted because including the gradual changing processing upon changing the number of cylinders, the switching control is similar to that of the first embodiment.

According to this second embodiment, the full-time operating cylinders are arranged such that their intake and exhaust valves IV, EV are not disabled. The valve actuators 33 are disabled to deactivate all the intake and exhaust valves IV, EV and hence to disable the cylinders. It is, therefore, possible to bring about advantageous effects that the control can be simplified. By arranging the cylinders, which are arranged closer to an inner side of the engine 1' (the crankshaft 2), as full-time operating cylinders, vibrations can be kept low even when one of the opposite end cylinders in the front bank is disabled. It is, therefore, possible to bring about an advantage that the commercial value can be heightened. Although the full-time operating cylinders are arranged in the rear bank Br in this embodiment, the arrangement of the opening 9 in the front bank Bf as in the first embodiment makes it possible to also feed cooling wind to the rear bank Br. It is, therefore, possible to reduce thermal loads on the full-time operating cylinders while keeping vibrations low. This embodiment is also advantageous in that, when the front bank Bf is provided with the opening 9 as in the first embodiment, running wind is allowed to flow from the opening 9 to the full-time operating cylinders located in the rear bank Br and to cool the rear bank Br.

Figure 4:
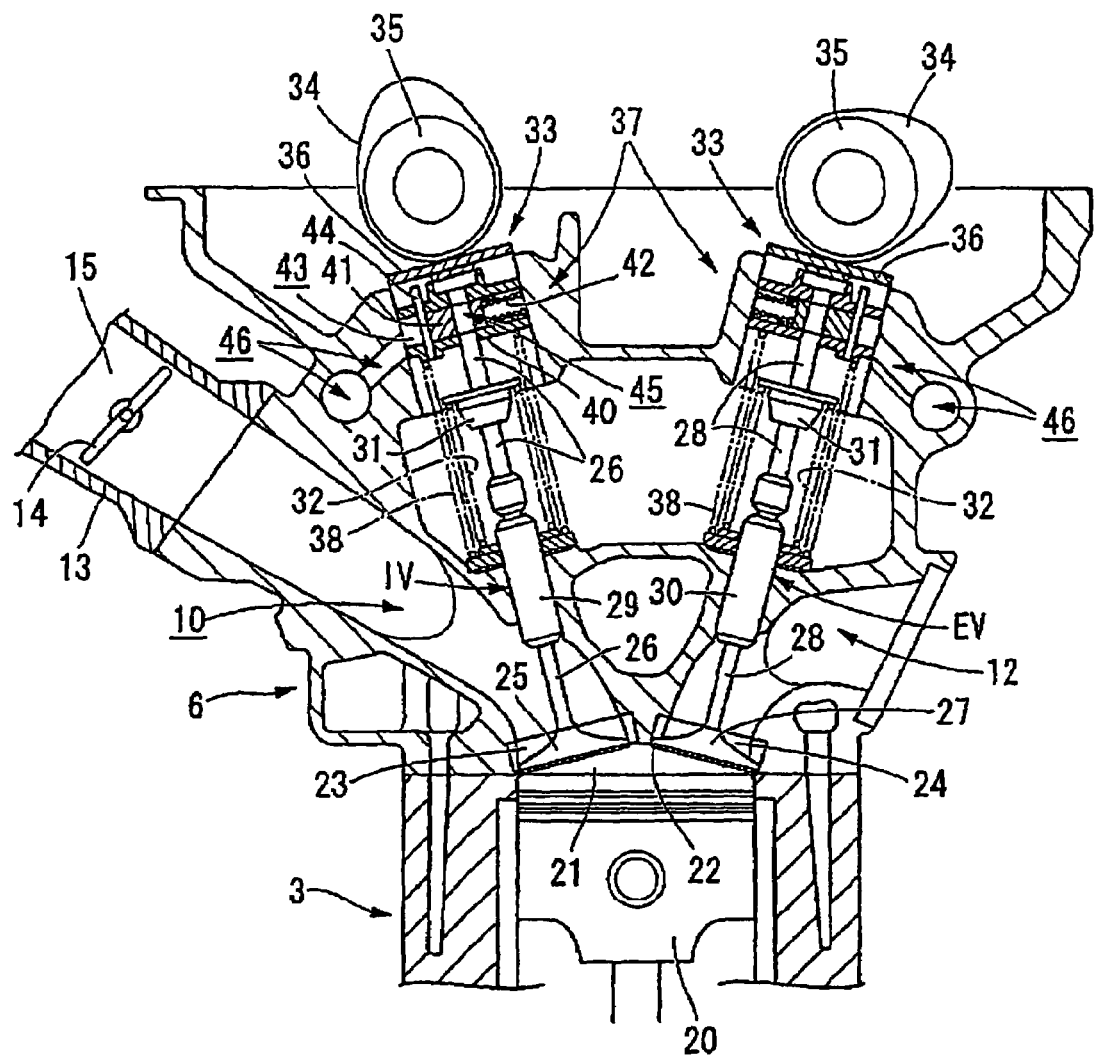
FIG. 4 is a side view of a cylinder head in the embodiment of the present invention.

A third embodiment of the present invention will next be described base on FIG. 10 to FIG. 12. It is to be noted that in the following description, a conventionally-known inline 4-cylinder engine is referred to as an example of an inline internal combustion engine. The construction of basic parts around the cylinders will be described by making reference to the section of the cylinder head 6 in the rear bank Br in FIG. 4 directed to the first embodiment.

An inline 4-cylinder engine 1" according to this embodiment is provided with a cylinder head 6 with intake and exhaust vales IV, EV arranged therein, valve actuators 33 for openably operating the intake and exhaust valves IV, EV, respectively, and a cylinder head cover 7 forming, in combination with the cylinder head 6, a valve actuator chamber with the valve actuators 33 accommodated therein, and at least some of the valve actuators 33 are deactivatable to disable their corresponding cylinders. In this engine 1", the cylinder #1, the cylinder #2, the cylinder #3 and the cylinder #4 are tandemly arranged from the left side.

Further, the cylinder #2 and cylinder #3, the two cylinders at the central part in the direction of the length of the crankshaft 2, are constructed as full-time operating cylinders which are phase shifted over 360 degrees and are fired at equal intervals, while the cylinder #1 and cylinder #4, the cylinders on the opposite end sides of the crankshaft 2, are constructed as deactivatable cylinders, respectively. Described specifically, the intake and exhaust valves IV, EV arranged for the cylinders #1 and #4 are provided with the valve deactivating mechanisms 37, respectively, and by the valve deactivating mechanisms 37, the intake and exhaust valves IV, EV for the cylinders #1 and #4 can all be disabled. Further, the cylinders #1 and #2 are arranged at positions phase shifted over 180 degrees, and so the cylinders #3 and #4.

Figure 10A:
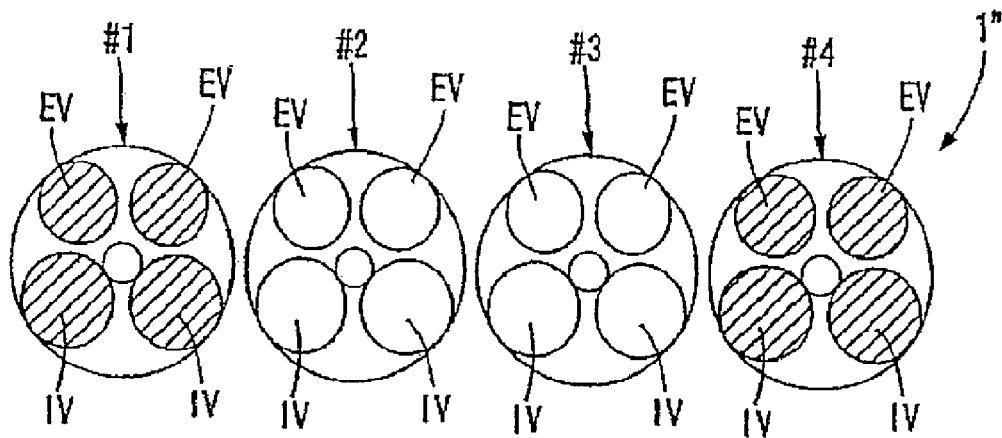
FIGS. 10(a) to 10(c) are plan views schematically illustrating operation modes of a third embodiment of the present invention.
Figure 10B:
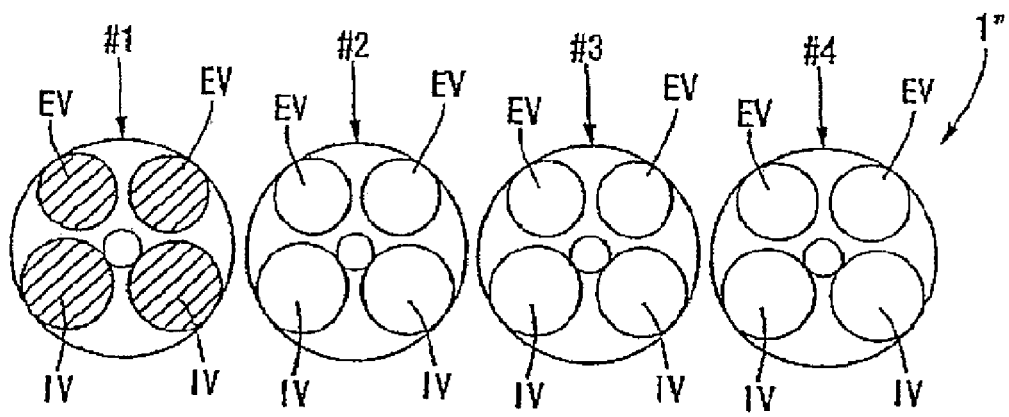
Figure 10C:
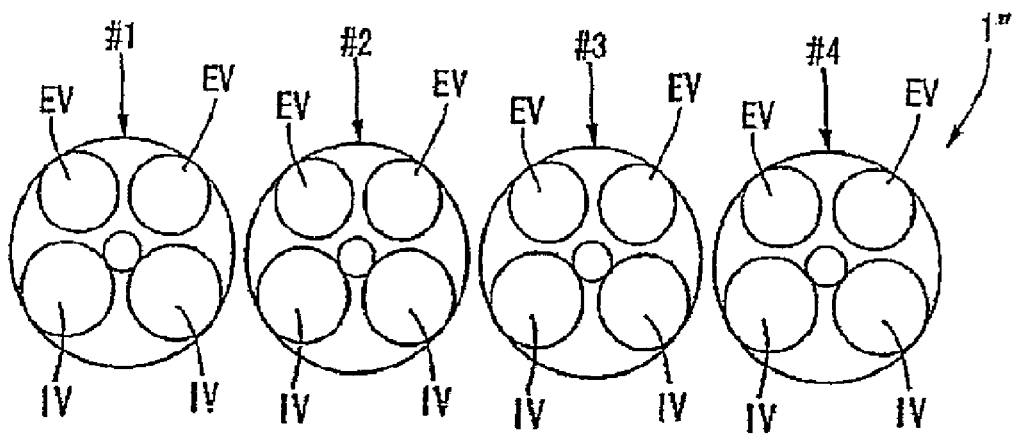

It is to be noted that as the operation mode of this engine 1", an operation mode in which one of the deactivatable cylinders on the opposite end sides of the crankshaft 2, specifically the cylinder #1 is disabled (see FIG. 10(a)), another operation mode in which both of the deactivatable cylinders, specifically the cylinder #1 and #4 are disabled (see FIG. 10(b)), and another operation mode in which both of the deactivatable cylinders, specifically the cylinder #1 and #4 are operated (see FIG. 10(c)) are designed to be changeable to each other.

Figure 11:
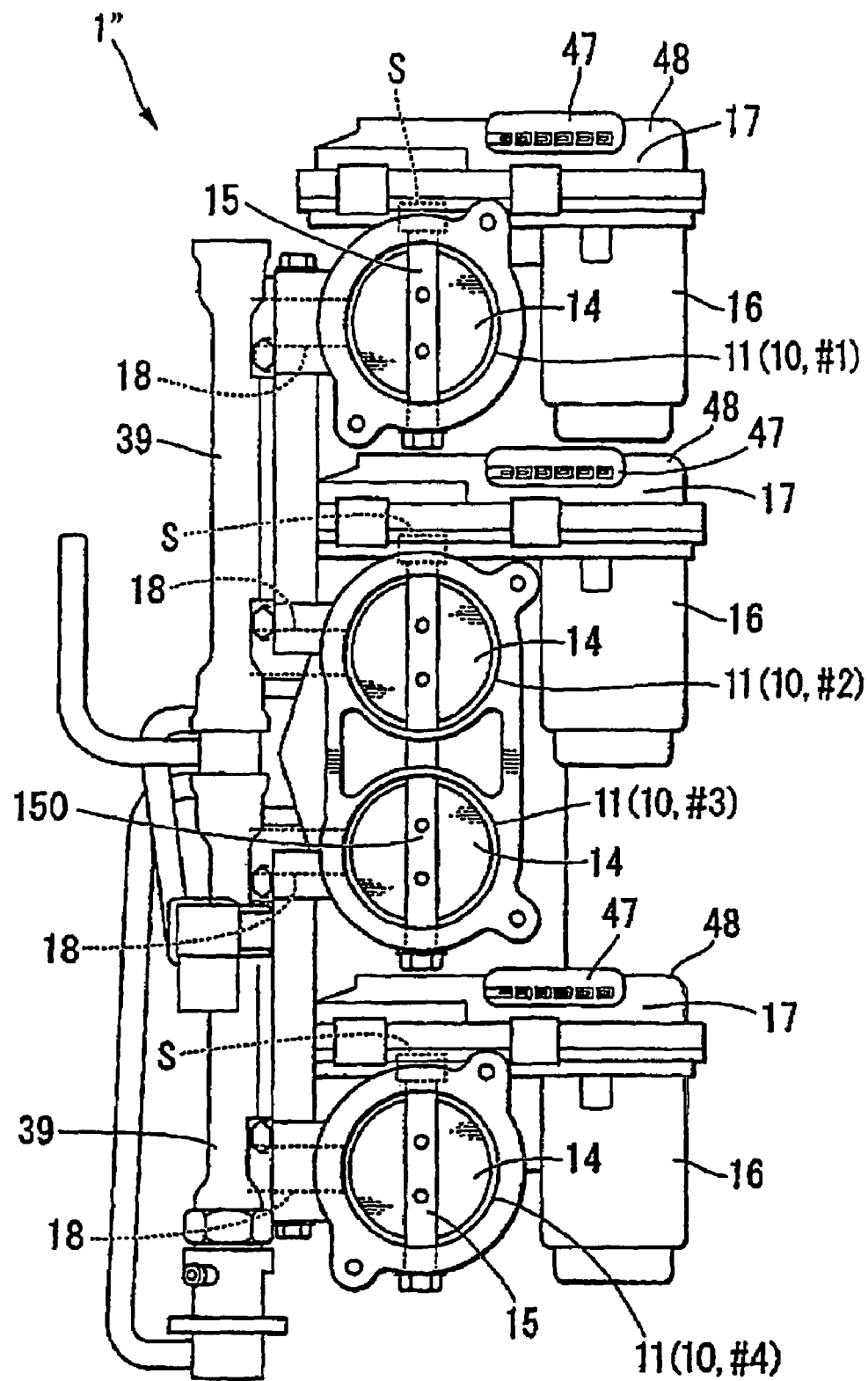
FIG. 11 is a plan view of the throttle bodies in the third embodiment of the present invention.
Figure 12:
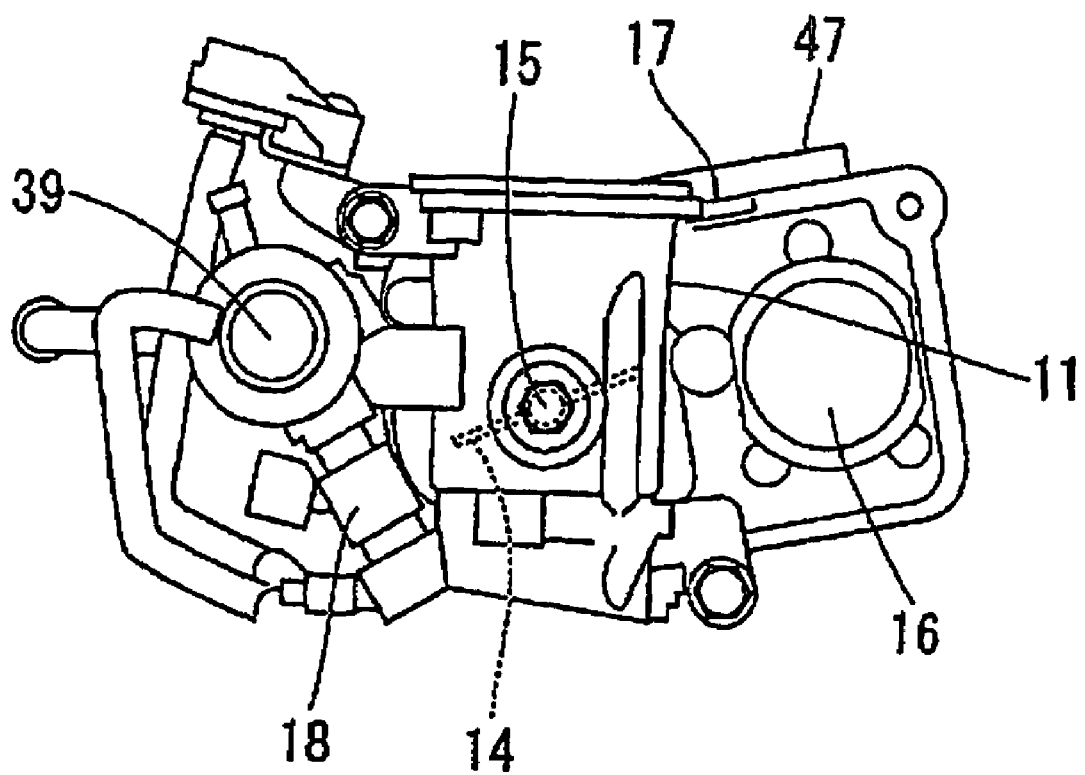
FIG. 12 is a plan view of one of the throttle bodies in the third embodiment of the present invention.

Specifically, as illustrated in FIG. 11 and FIG. 12, upwardly-extending intake manifolds 10 are arranged corresponding to the respective cylinders, that is, the cylinder #1, cylinder #2, cylinder #3 and cylinder #4, and throttle bodies 11 equipped with throttle valves 14 are attached to the respective intake manifolds 10.

The throttle valves 14, 14 for the cylinder #2 and cylinder #3 are opened and closed by a common shaft 150, and to the shaft 150, a motor 16 for driving the same is connected via a speed reduction mechanism 17 on a forward side of the throttle body 11. Accordingly, the throttle valves 14 for the cylinder #2 and cylinder #3 are simultaneously operated to open and close by the single motor 16. Further, an opening degree of each of the throttle valves 14, 14 is detected by a throttle valve opening degree sensor S arranged on the shaft 150. To shafts 15, 15 of the respective throttle valves 14, 14 for the cylinder #1 and cylinder #4, on the other hand, motors 16, 16 are connected via speed reduction mechanism 17, 17, respectively, and an opening degree of each throttle valve 14 is detected by a throttle valve opening degree sensor S arranged for the throttle valve 14.

In rear walls of the respective throttle bodies 11 and corresponding to the motors 16 arranged on the forward sides, injectors 18 are obliquely inserted and fixed toward cylinder heads 5 to inject fuel into the intake manifolds 10. Each motor 16 and its corresponding injector 18 are, therefore, arranged such that they are located apart forward and backward of the corresponding throttle body 11 and in the forward and rearward directions of the engine and a vehicle body, respectively.

It is to be noted that fuel pipes 39 are connected to the injectors 18, respectively. Connectors 47 are arranged on upper parts of casings 48 for the respective motors 16 and speed reduction mechanisms 17, and the connectors 47 are connected to the above-mentioned ECU 61.

According to this embodiment, the cylinder #2 and cylinder #3 are set as full-time operating cylinders that their intake and exhaust valves IV, EV are not disabled, and in one cylinder, its intake and exhaust valves IV, EV are all disabled to deactivate the cylinder. It is, therefore, possible to simplify the control and to promptly switch the operation. Further, the cylinder #2 and cylinder #3, the two cylinders in the central part in the direction of the length of the crankshaft 2, are arranged as full-time operating cylinders, and these cylinder #2 and cylinder #3 are fired at equal intervals. Vibrations can, therefore, be maintained low even in the operation mode that one (the cylinder #1) of the deactivatable cylinders on the opposite end sides of the crankshaft 2 is disabled, thereby making it possible to heighten the commercial value.

Owing to the adoption of the vibrationally-balanced arrangement that the cylinder #1 and cylinder #4 located on the opposite end sides of the crankshaft 2 are set as deactivatable cylinders and in the central part, the cylinder #2 and cylinder #3 are fired at equal intervals, vibrations can be maintained low, thereby making it possible to heighten the commercial value.

In this embodiment, it is also only necessary to arrange the three motors 16, the three speed reduction mechanisms 17, the three throttle valve opening degree sensors S, and the three connectors 7. Accordingly, the number of parts can be reduced to achieve a cost reduction.

It is to be noted that the present invention is not limited to the above-described embodiments and can also be applied, for example, to V-type 5-cylinder engines, V-type 6-cylinder engines and inline 6-cylinder engines. Further, the present invention can also be applied to multicylinder engines for 4-wheeled vehicles although it has been described taking motorcycles as examples.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multicylinder internal combustion engine comprising:
a cylinder head with engine valves arranged therein;
valve actuators for openably operating said engine valves, respectively;
a cylinder head cover forming, in combination with said cylinder head, a valve actuator chamber with said valve actuators accommodated therein, at least some of said valve actuators being deactivatable to disable their corresponding cylinders; and
a crankshaft,
wherein said multicylinder internal combustion engine is a V-shaped internal combustion engine provided with a front bank and rear bank, and the cylinders on opposite ends of the crankshaft are set as full-time operating cylinders, being located in the front bank, and the cylinders in the vicinity of a center of the crankshaft are set as deactivatable cylinders, being located in the rear bank;
wherein each of the full-time operating cylinders are connected to a position on the crankshaft further toward the end of the crankshaft than each of the deactivatable cylinders is connected.

2. The multicylinder internal combustion engine according to claim 1, wherein said V-type internal combustion engine is to be mounted on a motorcycle.

3. The multicylinder internal combustion engine according to claim 1, wherein said V-type internal combustion engine is to be mounted on a motorcycle.

4. The multicylinder internal combustion engine according to claim 1, wherein said internal combustion engine is a V-shaped 4-cylinder internal combustion engine, an operation mode of said internal combustion engine is selectively changeable to one of operation modes consisting of an operation mode in which one of the deactivatable cylinders is disabled, another operation mode in which both of the deactivatable cylinders are disabled, and a further operation mode in which both of the deactivatable cylinders are operated, and both of the deactivatable cylinders are located in a same one of the front bank and the rear bank.

5. The multicylinder internal combustion engine according to claim 1, wherein said internal combustion engine is a V-shaped 4-cylinder internal combustion engine, and a number of operating cylinders is selectively changeable in three patterns.

6. The multicylinder internal combustion engine according to claim 2, wherein said internal combustion engine is a V-shaped 4-cylinder internal combustion engine, and a number of operating cylinders is selectively changeable in three patterns.

7. The multicylinder internal combustion engine according to claim 1, wherein a valve deactivating mechanism is arranged between a valve stem and a valve lifter to deactivate some at least some of the valve actuators and disable their corresponding cylinders.

8. The multicylinder internal combustion engine according to claim 1, wherein a valve deactivating mechanism is arranged between a valve stem and a valve lifter to deactivate some at least some of the valve actuators and disable their corresponding cylinders.

9. The multicylinder internal combustion engine according to claim 1, wherein the full-time operating cylinders are located in one of the front bank and the rear bank, the deactivatable cylinders are located in the other one of the front bank and the rear bank, and the deactivatable cylinders are located closer to a center of the crankshaft than the full-time operating cylinders.

10. The multicylinder internal combustion engine according to claim 1, wherein said internal combustion engine is operatable to activate only some of the deactivatable cylinders and deactivate rest of the deactivatable cylinders in a same one of the front bank and the rear bank.

11. The multicylinder internal combustion engine according to claim 1, wherein an opening is formed through the front bank at a central part thereof, said opening being arranged to allow the air to flow toward the rear bank.

12. The multicylinder internal combustion engine according to claim 1, wherein said multicylinder internal combustion engine includes four cylinders; two full-time operating cylinders are supported at one side of the crankshaft and two deactivatable cylinders are supported at an other side of the crankshaft opposite to the full-time operating cylinders, and
wherein the two deactivatable cylinders are located in between the two full-time operating cylinders.

13. A multicylinder internal combustion engine comprising:
a cylinder head with engine valves arranged therein;
valve actuators for openably operating said engine valves, respectively;
a cylinder head cover forming, in combination with said cylinder head, a valve actuator chamber with said valve actuators accommodated therein, at least some of said valve actuators being deactivatable to disable their corresponding cylinders; and
a crankshaft,
wherein said multicylinder internal combustion engine is a V-shaped internal combustion engine provided with a front bank and rear bank, the cylinders on opposite ends of the crankshaft in said front bank are set as said deactivatable cylinders, and the cylinders in said rear bank are set as full-time operating cylinders,
wherein each of the deactivatable cylinders are connected to a position on the crankshaft further toward the end of the crankshaft than each of the full-time operating cylinders is connected.

14. The multicylinder internal combustion engine according to claim 13, wherein said internal combustion engine is a V-shaped 4-cylinder internal combustion engine, and an operation mode of said internal combustion engine is selectively changeable to one of operation modes consisting of an operation mode in which one of the deactivatable cylinders is disabled, another operation mode in which both of the deactivatable cylinders are disabled, and a further operation mode in which both of the deactivatable cylinders are operated.

15. The multicylinder internal combustion engine according to claim 13, wherein a valve deactivating mechanism is arranged between a valve stem and a valve lifter to deactivate some at least some of the valve actuators and disable their corresponding cylinders.

16. The multicylinder internal combustion engine according to claim 13, wherein the cylinders in said rear bank are located closer to a center of the crankshaft than the cylinders in said front bank.

17. The multicylinder internal combustion engine according to claim 13, wherein said front bank only has the deactivatable cylinders and the multicylinder internal combustion engine is operatable to activate only some of the deactivatable cylinders and deactivate rest of the deactivatable cylinders.

18. A multicylinder internal combustion engine comprising:
a cylinder head with engine valves arranged therein;
valve actuators for openably operating said engine valves, respectively;
a cylinder head cover forming, in combination with said cylinder head, a valve actuator chamber with said valve actuators accommodated therein, at least some of said valve actuators being deactivatable to disable their corresponding cylinders; and
a crankshaft,
wherein said multicylinder internal combustion engine is an inline internal combustion engine, the two cylinders at a central part of the crankshaft are constructed as full-time operating cylinders that are fired at equal intervals, the cylinders on opposite end sides of said crankshaft are constructed as deactivatable cylinders, respectively, and an operation mode of said inline internal combustion engine is selectively changeable to one of operation modes consisting of an operation mode in which one of said deactivatable cylinders on the opposite end sides of said crankshaft is disabled, another operation mode in which both of said deactivatable cylinders are disabled, and a further operation mode in which both of said deactivatable cylinders are operated,
wherein each of the deactivatable cylinders are connected to a position on the crankshaft further toward the end of the crankshaft than each of the full-time operating cylinders is connected.

19. The multicylinder internal combustion engine according to claim 18, wherein said internal combustion engine is an inline 4-cylinder internal combustion engine.

20. The multicylinder internal combustion engine according to claim 19, wherein said deactivatable cylinders are the cylinders located on the opposite end sides of said crankshaft.

21. The multicylinder internal combustion engine according to claim 18, wherein a valve deactivating mechanism is arranged between a valve stem and a valve lifter to deactivate some at least some of the valve actuators and disable their corresponding cylinders.

22. The multicylinder internal combustion engine according to claim 18, wherein the two full-time operating cylinders are located in a first bank and the two deactivatable cylinders are located in a second bank different from the first bank.

23. The multicylinder internal combustion engine according to claim 18, wherein the two deactivatable cylinders are located in a same bank.

* * * * *